(12) United States Patent
Nelson

(10) Patent No.: US 6,904,484 B1
(45) Date of Patent: Jun. 7, 2005

(54) LOW PIN COUNT (LPC) FIRMWARE HUB RECOVERY

(75) Inventor: Albert Rudy Nelson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,517

(22) Filed: Mar. 30, 2000

(51) Int. Cl.[7] .............................................. G06F 13/00
(52) U.S. Cl. ...................... 710/300; 710/305; 710/104; 713/1; 365/185.8; 365/185.11; 365/185.33
(58) Field of Search ........................ 710/104, 300–304, 710/305–317; 713/1; 365/185.08, 185.11, 185.33

(56) References Cited

U.S. PATENT DOCUMENTS

| | | | |
|---|---|---|---|
| 5,600,801 A | * | 2/1997 | Parks et al. ................. 710/104 |
| 5,784,611 A | * | 7/1998 | Thantrakul ..................... 713/1 |
| 6,188,602 B1 | * | 2/2001 | Alexander et al. ...... 365/185.04 |
| 6,291,976 B1 | * | 9/2001 | Kaminski et al. ........... 323/283 |
| 6,442,067 B1 | * | 8/2002 | Chawla et al. ......... 365/185.08 |
| 2001/0018721 A1 | * | 8/2001 | McKenna et al. .......... 710/126 |
| 2002/0184297 A1 | * | 12/2002 | Krancher et al. ........... 709/201 |
| 2003/0023761 A1 | * | 1/2003 | Jeansonne et al. .......... 709/250 |

\* cited by examiner

Primary Examiner—Rupal Dharia
(74) Attorney, Agent, or Firm—Paul E. Steiner

(57) ABSTRACT

A method and apparatus for low pin count firmware hub recovery on a circuit board having a firmware hub includes coupling a firmware hub recovery module having a firmware program onto the circuit board, establishing communication between a central processing unit (CPU) and the firmware hub recovery module, and reprogramming the firmware hub by the firmware program.

22 Claims, 3 Drawing Sheets

LOW PIN COUNT (LPC) FIRMWARE HUB RECOVERY

FIELD OF THE INVENTION

Embodiments of the present invention provide a method and apparatus for firmware hub programming on a circuit board. More particularly, embodiments of the present invention provide methods and apparatus for low pin count (LPC) firmware hub recovery on a circuit board via a firmware hub recovery module.

BACKGROUND OF THE INVENTION

Conventional computer systems include a variety of peripheral and memory devices that communicate with the systems's central processing unit (CPU) or chip-set processor via an Industry Standard Architecture (ISA) bus or an Expansion bus (X-bus). The CPU or chip-set processor includes a large amount of pins (e.g., approximately 50–70) and associated circuitry to support the ISA bus or X-bus signals that are used to interface the CPU or chip-set processor with the peripheral devices including input/output (I/O) or I/O controllers, floppy disk controller, keyboard controllers, and memory devices such as non-volatile memory devices that store, for example basis input-output system (BIOS) information.

The large number of pins needed to support the ISA bus and X-bus standards generally increase the overall system cost. For example, larger packages are required for a CPU or chip-set. The development of the low pin count (LPC) bus has obviated to some extent the problem mentioned above. The LPC bus includes general purpose signal lines that carry substantially all time-multiplexed address, data and control information to implement memory, I/O, and bus transactions between the CPU and other system devices.

Presently there are no other peripheral components that are connected to the LPC bus because the LPC bus is designed to be a "local bus" servicing the chip-set. The LPC bus does not provide for expandability for add-on features like that provided for by a Peripheral Component Interconnect (PCI) (e.g., PCI Local Bus Specification, version 2.1, a copy of which may be obtained from the PCI Special Interest Group) bus for example. In general the LPC bus may be limited to being coupled to a system bus interface controller and one or more memory devices. As used herein, the term "firmware hub" refers to the memory devices coupled to a LPC bus.

The firmware in the firmware hub is a computer program including a series of instructions or statements arranged in a specific sequence and written in a language executable by the processor of the computing device to achieve a certain result.

Firmware, as used herein, refers to those computer programs whose instructions and/or data are stored and maintained permanently in the computing device without the need for the continued application of power. One such computer program is the basic input/output system (BIOS). These computer programs, like the BIOS are typically stored in non-volatile read only memory (ROM), programmable read only memory (PROM) or erasable programmable read only memory (EPROM). Use of a non-volatile memory obviates the need to reload the programming into the computing device in the event of a power loss or turn-off.

Erasable programmable read only memory (EEPROM) does not require replacing memory chips storing firmware when programming corrections or upgrades are required. The EEPROM includes a read only memory device whose individual data storage locations (addresses) are erasable and can be reprogrammed by applying certain electrical signals to the chip. New firmware can thus be stored in the chip without removing the chip from the computing device. However, in situations where the computing device's firmware has been corrupted to an extent that the computing device is unable to boot-up, the above mentioned method of supplying new firmware is not available. In these cases, there is no other solution but to replace the firmware chip.

In view of the foregoing, it can be appreciated that a substantial need exists for a method and apparatus for low pin count firmware hub recovery.

BRIEF DESCRIPTION OF THE DRAWINGS

The features and advantages of the present invention will become apparent from the following detailed description in combination with the figures listed below.

DETAILED DESCRIPTION

Embodiments of methods and systems for low pin count (LPC) firmware hub recovery using a firmware hub recovery module.

In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciated that the specific sequence in which methods are presented and performed are illustrative and it is contemplated that the sequences can be varied and still remain within the spirit and scope of the present invention.

Figure 1:
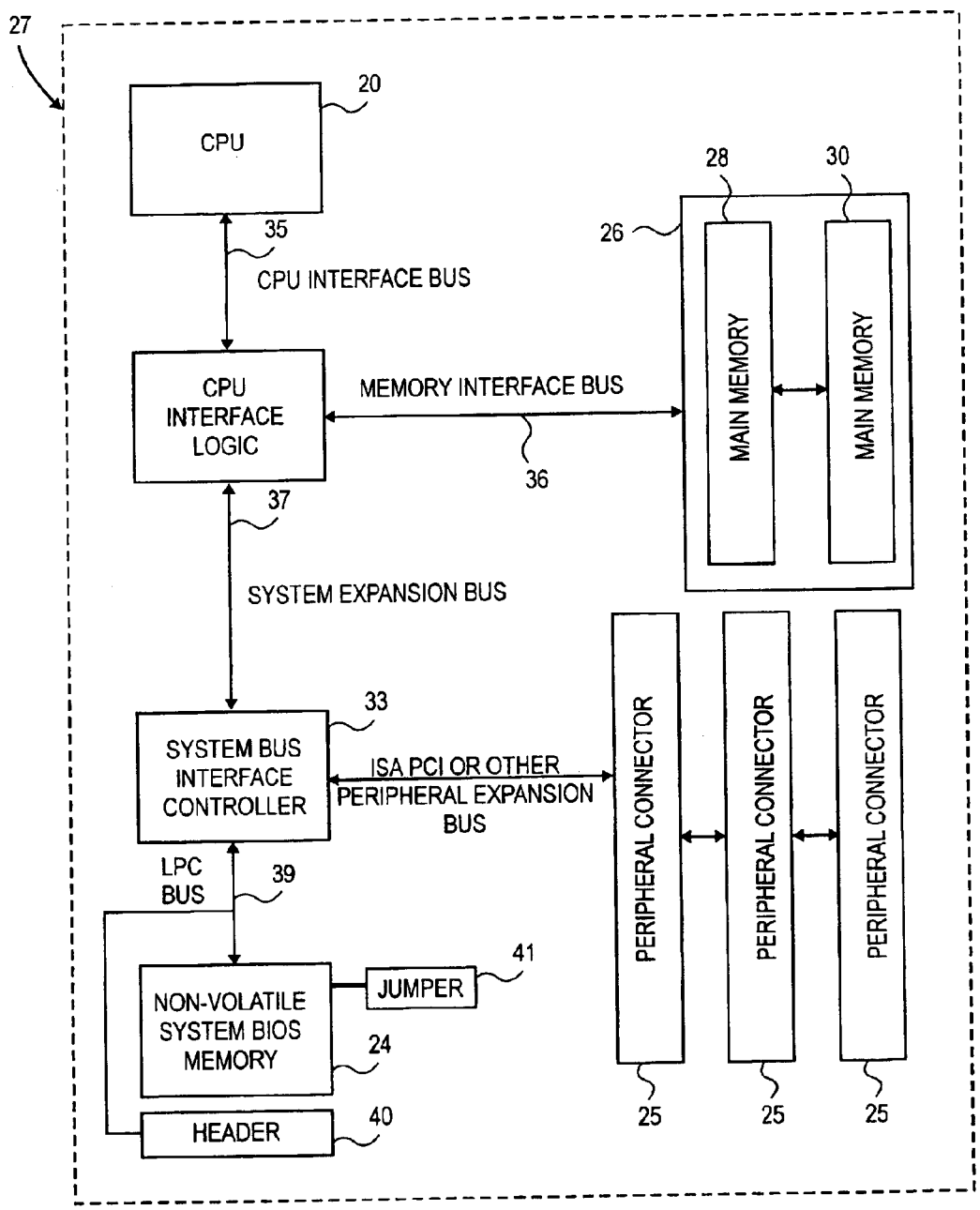
FIG. 1 is a block diagram of an circuit board including a low pin count (LPC) bus according to an embodiment of the present invention.

FIG. 1 illustrates a block diagram of a computer system's circuit board 27 including a low pin count (LPC) bus 39 according to an embodiment of the present invention. Circuit board 27 may be a mother board and typically includes a processor such as a central processing unit or CPU 20. The CPU is the "brains" or "engine" of the computer system responsible for overseeing all execution of operations in the computer. Motherboard 27 also includes CPU interface logic 21, coupled to CPU 20 and interfacing CPU 20 with other circuit components such as a system bus interface controller 33 and main memory 26. As shown, system bus interface controller 33 may be any type of expansion bus controller such as a PCI bus or peripheral bus I/O controller. System bus interface controller 33 is coupled to CPU interface logic 21 and is coupled to peripheral connectors 25 via expansion bus 38. A bus that complies with a Peripheral Component Interconnect (PCT) standard (e.g., PCI Local Bus Specification, version 2.1, a copy of which may be obtained from the PCI Special Interest Group) is a example of such an expansion bus. Main memory 26 may include random access memory (RAM) 28 and read only memory (ROM) 30 which coupled to CPU interface logic 21.

Also included on motherboard 27 is a header connector 40 and a jumper 41. Header connector 40 is an internal connector soldered to motherboard used to connect a firmware hub recovery module to the motherboard. Jumper 41 may be a strapping jumper for setting an identification (ID) for a Basic Input Output System (BIOS) firmware hub 24 as described in detail below.

Firmware hub 24 includes a collection of software routines and functions that communicate directly with the hardware of motherboard 27. The BIOS of firmware hub 24 includes code that performs a limited diagnostic of the computer system during the power-on stage know as the "Power On Self Test (POST)." When power is applied to the computer system, BIOS firmware is executed by the CPU 20 before the computer system's operating system is activated. Firmware hub 24 further includes ID pins which require configuration to have CPU 20 recognize it as the booting firmware hub. Strapping jumper 41 is added to the motherboard to allow the ID for the booting firmware hub to changed. This enables an alternative firmware hub, beside firmware hub 24, to be recognized by the CPU as the booting firmware hub, by simply moving the strapping jumper 41 from one location to another location. In the event the firmware located on firmware hub 24 has become corrupted, strapping jumper 24 can be moved such that another firmware hub can be recognized as the booting firmware. According to an embodiment of the present invention and described in detail below, firmware hub 24 can be reprogrammed by a firmware hub recovery module.

Referring back to FIG. 1, the hardware components of motherboard 27 communicate along data pathway or busses 35, 36, 37, 38 and 39 which is included on motherboard 27 which houses the CPU 20, main memory 26, and other components including BIOS firmware chip 24 and bus and I/O controller 33. Several types of busses shown in FIG. 1 may include for example, CPU Interface Busses, Memory Interface Busses, System Expansion Busses and Industry Standard Architecture (ISA) Buses.

Figure 2:
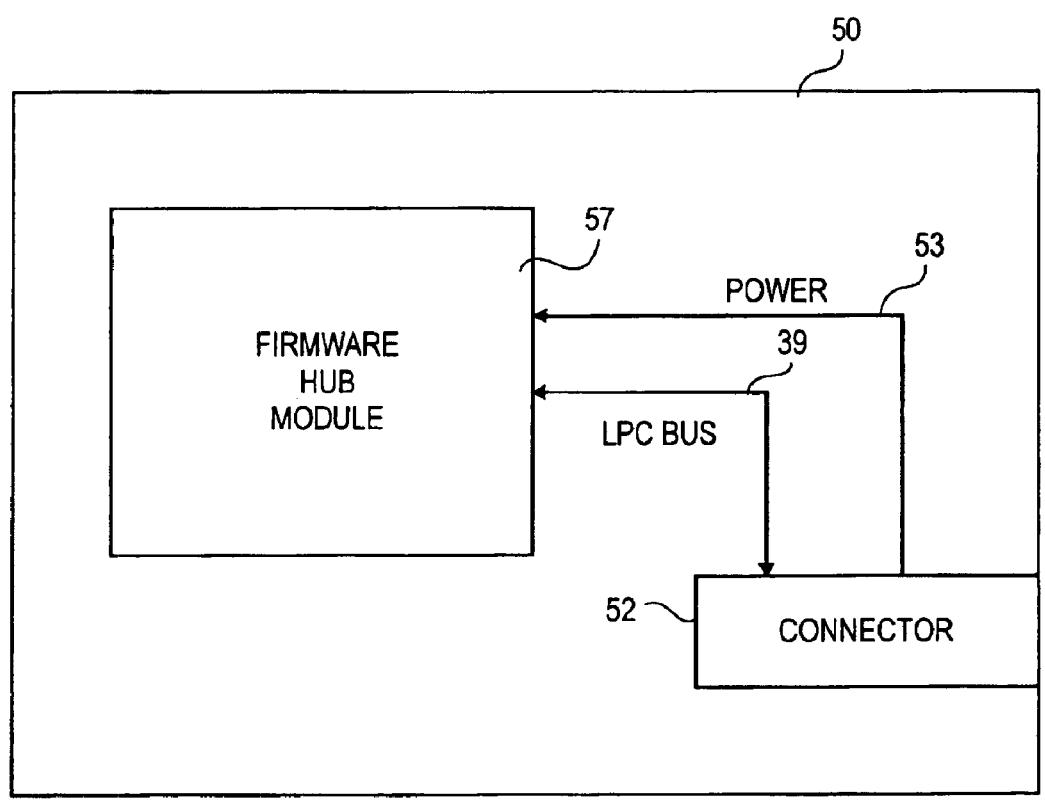
FIG. 2 is a block diagram of a firmware hub updating module according to an embodiment of the present invention.

FIG. 2 is a block diagram of a firmware hub recovery module according to an embodiment of the present invention. Firmware hub recovery module 50 may be implemented as an external card coupled to header connector 40 which communicates with LPC bus 39 on motherboard 27. According to an embodiment of the present invention, firmware hub recovery module requires no external connections via cable, etc. All necessary signals are presented on the LPC bus 39. Firmware hub recovery module 50 includes firmware hub module 51 and a connector 52. Connector 52 is plugged into connector 40 on motherboard 27 to connect the module with the motherboard. Firmware hub module 51 may be stored on an erasable programmable read only memory (EPROM).

Firmware hub module 51 is powered by motherboard 27 through connectors 40 and 52 as shown by power line 53, and communicates with the other system components of motherboard 27 via LPC bus 39. Firmware hub module 51 provides firmware so that CPU 20 can perform various functions of compensating for an inadequate BIOS found on firmware hub 24. Such functions may include booting operations, system diagnostics and system reprogramming.

Figure 3:
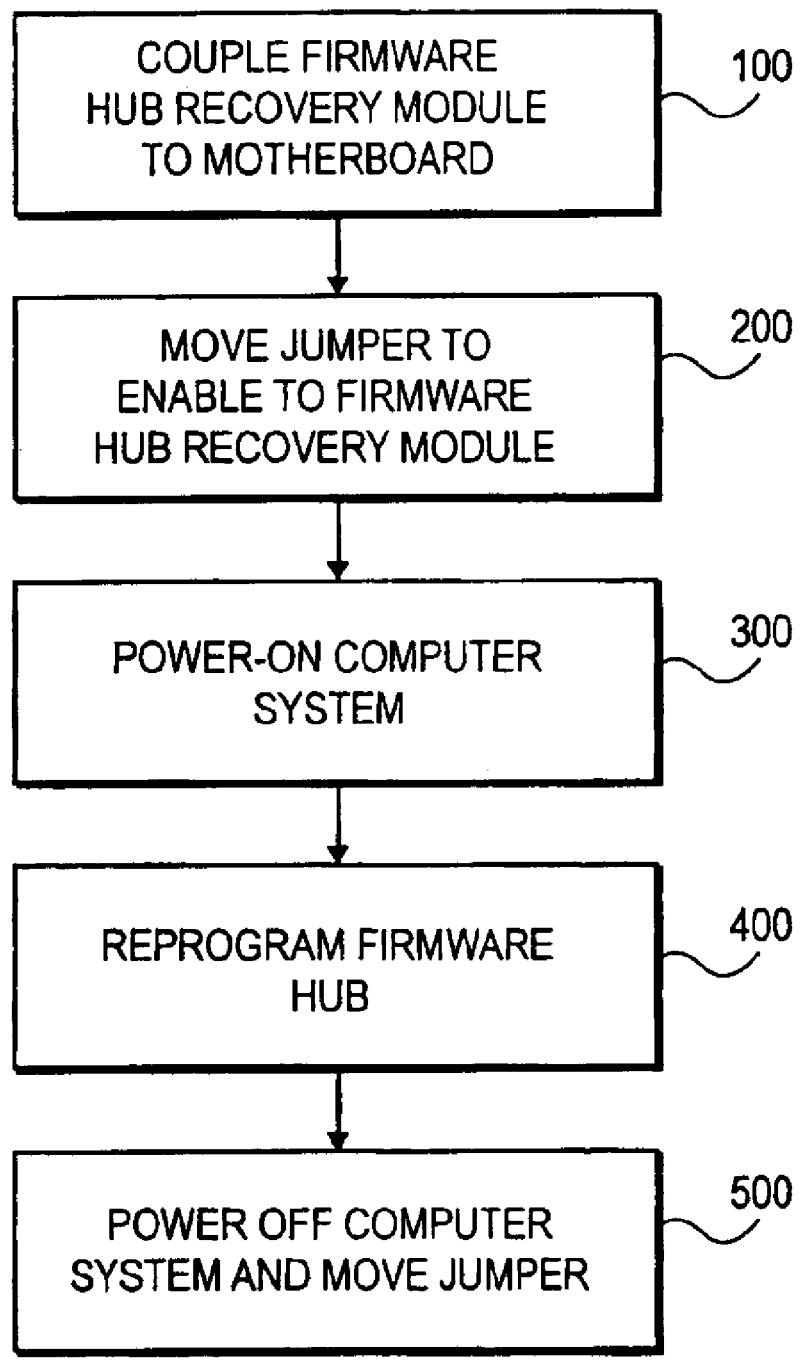
FIG. 3 is a flow diagram illustrating a method for low pin count (LPC) firmware hub recovery in accordance with an embodiment of the present invention.

By way of further illustration, FIG. 3 illustrates a method for a low pin count (LPC) firmware hub recovery that may be implemented using the structures described with reference to the embodiments in FIGS. 1–2. In accordance with this embodiment, the firmware hub recovery module 50 is coupled to the motherboard 27 by mating connector 52 of the recovery module with header connector 40 of the motherboard (Step 100). This coupling provides an electrical as well as a mechanical connection between firmware hub recovery module 50 and motherboard 27 such that power will be supplied to the recovery module 50 and information will be transmitted to and from the motherboard 27 and firmware hub recovery module 50. Strapping jumper 41 is moved from one pin location to another pin location such that firmware hub 24 is no longer recognized as the booting firmware hub. Instead, firmware hub recovery module 50, once connected to motherboard 27, is now recognized as the booting firmware hub (Step 200). The computer system is then powered on (Step 300). The CPU out an ID for the booting firmware hub. Since strapping jumper 41 changed the booting firmware hub ID from firmware hub 24 to firmware hub recovery module 50, the system is booted by firmware hub module 51 on the recovery module 50. After the computer has been booted up, the firmware hub module 51 is used along with CPU to reprogram the firmware hub 24 on the motherboard (Step 400). After the firmware hub has been reprogrammed, the computer system is powered off and jumper 41 is moved back to its original pin position, assigning firmware hub 24 as the booting firmware hub (Step 500). Thus, the next time the computer system is powered on, firmware hub 24 is used for the booting process.

In the foregoing, detailed descriptions of the apparatus accordance with embodiments of the present invention have been described with reference to specific exemplary embodiments. Accordingly, the present specification and figures are to be regarded as illustrative rather than restrictive. Moreover, although software or hardware are described to control the certain functions, such functions may be performed using either software, hardware, or a combination of software and hardware, as is well know in the art.

What is claimed is:

1. A method for low pin count firmware hub recovery on a circuit board of a computer system having a firmware hub comprising:

coupling a firmware hub recovery module having a firmware program to said circuit board;

establishing communication between a central processing unit (CPU) and the firmware hub recovery module via a low pin count (LPC) bus; and booting the computer.

2. The method for low pin count firmware hub updating according to claim 1 further comprising reprogramming said firmware hub.

3. The method for low pin count firmware hub updating according to claim 1, wherein said establish communication between the central processing unit (CPU) and the firmware hub recovery module includes assigning said firmware hub recovery module as a firmware booting program.

4. The method for low pin count firmware hub recovery according to claim 1, wherein said reprogramming said firmware hub includes reading the firmware hub recovery module firmware program and writing the firmware hub recovery module firmware program into the firmware hub to replace a program in said firmware hub.

5. The method for low pin count firmware hub recovery according to claim 1, further comprising powering said computer system before reprogramming said firmware hub.

6. The method for low pin count firmware hub recovery according to claim 3, further comprising reassigning said firmware hub as the firmware booting hub after said firmware hub has been reprogrammed.

7. The method for low pin count firmware hub recovery according to claim 1 further comprising supplying power to said firmware hub recovery module by said circuit board.

8. A low pin count firmware hub recovery system for a circuit board of a computer system having a firmware hub comprising:
 a connector for coupling a firmware hub recovery module to said circuit board;
 a central processing unit (CPU) communicating with said firmware hub recovery module via a low pin count (LPC) bus; and
 a jumper for enabling said firmware hub recovery module as a booting firmware hub.

9. The low pin count firmware hub recovery system according to claim 8, further comprising firmware programming located on said firmware hub recovery module for reprogramming said firmware hub.

10. The low pin count firmware hub recovery system according to claim 8, further comprising a power supply to supply power to said circuit board.

11. The low pin count firmware hub recovery system according to claim 10, wherein power is supplied to said firmware hub recovery module by said circuit board.

12. The low pin count firmware hub recovery system according to claim 8, wherein said firmware hub recovery module includes an erasable programmable read only memory (EPROM).

13. The low pin count firmware hub recovery system according to claim 8, wherein said jumper is a strapping jumper.

14. A firmware hub recovery module for a circuit board of a computer system having a firmware hub comprising:
 a connector for coupling said firmware hub recovery module to said circuit board; and
 a firmware hub module communicating with a central processing unit (CPU) via a low pin count (LPC) bus, such that said firmware hub module is capable of functioning as a booting firmware hub.

15. The firmware hub recovery module according to claim 14, wherein said firmware hub recovery module is powered by said circuit board.

16. The method according to claim 1, wherein the CPU communicates with the firmware hub recovery module only via the LPC bus.

17. The method according to claim 1, futher comprising:
 before booting the computer, sending an identification from the CPU for a desired booting firmware hub over the LPC bus; and
 recognizing the firmware hub recovery module as the booting firmware hub in accordance with the identification sent from the CPU.

18. The system according to claim 8, wherein the CPU communicates with firmware hub recovery module only via the LPC bus.

19. The system according to claim 8, wherein the CPU is adapted to send an indentification for the booting firmware hub over the LPC bus, and wherein the firmware hub recovery module is enabled as the booting firmware hub in accordance with the identification sent from the CPU.

20. The system according to claim 8, further comprising:
 CPU interface logic connected to the CPU by a CPU interface bus;
 main memory connected to the CPU interface logic by a memory interface bus;
 a system bus interface controller connected to the CPU interface logic by a system expansion bus; and
 at least one peripheral connector connected to the system bus interface controller by a peripheral expansion bus,
 wherein the LPC bus provides connections between the firmware hub recovery module and the system bus interface controller.

21. The firmware recovery hub module according to claim 14, wherein the firmware hub module communicates with the CPU only via the LPC bus.

22. The firmware recovery hub module according to claim 14, wherein the CPU is adapted to send an identification for the booting firmware hub over the LPC bus, and wherein the firmware hub module is adapted to function as the booting firmware hub in accordance with the identification sent from the CPU.

* * * * *